United States Patent
Chiou

(10) Patent No.: US 7,018,298 B1
(45) Date of Patent: Mar. 28, 2006

(54) PIVOTAL DRIVING TOOL ASSEMBLY

(76) Inventor: Li Jiun Chiou, No. 56, Nan Gang Road, Nan Gang Tsuen, Guo Hsin Hsiang, Nantou Hsien 544 (TW)

( * ) Notice: Subject to any disclaimer, the term of this patent is extended or adjusted under 35 U.S.C. 154(b) by 0 days.

(21) Appl. No.: 10/963,249

(22) Filed: Oct. 12, 2004

Related U.S. Application Data

(63) Continuation-in-part of application No. 10/425,374, filed on Apr. 28, 2003, now abandoned.

(51) Int. Cl.
*F16D 3/18* (2006.01)
(52) U.S. Cl. ............... 464/159; 464/106; 464/901; 464/158; 81/177.75; 81/177.85; 81/177.8
(58) Field of Classification Search ............... 464/106, 464/139, 29, 143, 153, 158, 159, 901; 81/177.75, 81/177.7, 177.8, 177.9, 177.85; 403/322.2, 403/359.5, 361
See application file for complete search history.

(56) References Cited

U.S. PATENT DOCUMENTS

| | | | |
|---|---|---|---|
| 4,818,157 A | 4/1989 | Kouvelis | |
| 4,995,850 A | 2/1991 | van der Drift et al. | |
| 5,547,032 A | 8/1996 | Wenzel | |
| 5,577,426 A * | 11/1996 | Eggert et al. | ........... 81/439 |
| 5,827,122 A | 10/1998 | Kurian | |
| 5,918,512 A | 7/1999 | Habermehl et al. | |
| 6,105,473 A * | 8/2000 | Huang | ........ 81/177.75 |
| 6,290,606 B1 | 9/2001 | Hodson | |
| 6,347,564 B1 * | 2/2002 | Ciocca | ........... 81/177.8 |
| 2004/0214646 A1 * | 10/2004 | Chiou | ............. 464/158 |

* cited by examiner

*Primary Examiner*—Aaron Dunwoody
(74) *Attorney, Agent, or Firm*—Charles E. Baxley

(57) ABSTRACT

A pivotal driving tool includes a socket having a non-circular cavity formed by three or more planer side walls, and having an inner retaining ring. A mandrel includes a driving shank having a non-circular cross section for engaging into the socket, to allow the socket to be rotated by the mandrel. The mandrel includes a narrowed neck portion to allow the mandrel to be pivoted relative to the socket, and one or more flat surfaces to solidly anchor the driving shank to the socket. A magnetic member may be disposed in the mandrel, to act on and to pull the driving shank into the cavity of the socket. A barrel may be slidably engaged onto the socket, to engage onto and to be disengaged from the mandrel.

8 Claims, 5 Drawing Sheets

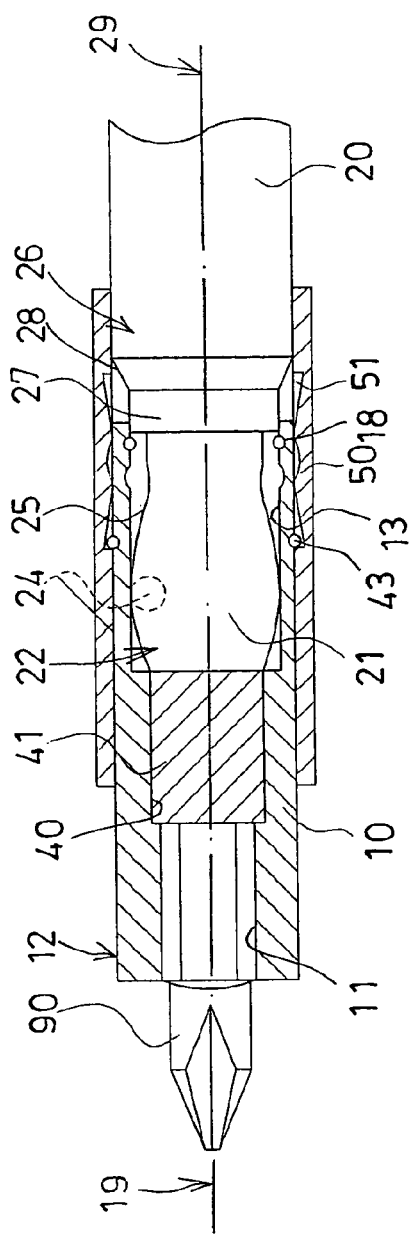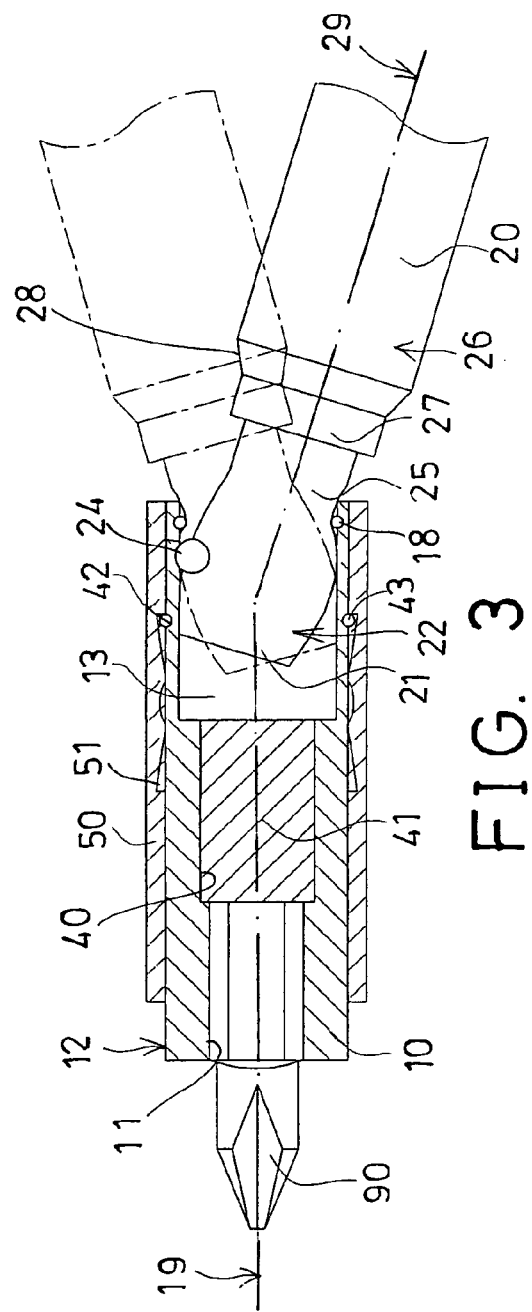

PIVOTAL DRIVING TOOL ASSEMBLY

The present invention is a continuation-in-part of U.S. patent application Ser. No. 10/425,374, filed 28 Apr. 2003, pending, to be abandoned.

BACKGROUND OF THE INVENTION

1. Field of the Invention

The present invention relates to a pivotal driving tool assembly, and more particularly to a pivotal driving tool assembly having a lock device to prevent tool members from being disengaged from each other.

2. Description of the Prior Art

Typical adapters are provided to attach or to couple various tool members to driving machines or tools, for allowing the tool members to be rotated or driven by the driving machines. For example, U.S. Pat. No. 4,818,157 to Kouvelis discloses one of the typical adapters comprising one or more shafts or tools to be attached or changed and secured to a rotary tool with a chuck. However, the shafts or tools may not be rotated or pivoted or changed to different angular positions relative to the rotary tool.

U.S. Pat. No. 4,995,850 to Van der Drift et al. discloses a typical homokinetic coupling having a guiding device having a radial spring force action, and having two components coupled together with balls, and in a manner as to accommodate swiveling motion therebetween. However, a complicated retaining device is required to retain the balls to the components.

U.S. Pat. No. 5,547,032 to Wenzel discloses an apparatus for drilling curved sections of well holes, also including two or more components coupled together with spring-biased balls. However, similarly, a complicated retaining device is required to retain the balls to the components.

U.S. Pat. No. 5,827,122 to Kurian discloses a typical radial free motion drive device including a shaft retractably engaged in a sleeve, and rotatable or adjustable relative to the sleeve for a limited angular moving stroke. However, the longitudinal axes of the shaft and the sleeve may not be tilted relative to each other, such that the sleeve may not be rotated or driven by the shaft in different angular positions relative to each other.

U.S. Pat. No. 5,918,512 to Habermehl et al. discloses a typical replaceable bit screwdriver assembly including a socket having a resilient split ring to retain a bit in the socket. For allowing the bit to be pivoted relative to the socket, an enlarged groove is required to be formed in the inner portion of the socket, and a forwardmost mouth portion of the socket is required to have frustoconical side walls formed therein. However, the enlarged groove and the frustoconical mouth portion of the socket may greatly reduce the strength of the socket, and the socket may have a good chance to be broken at the enlarged groove and the frustoconical mouth portion thereof.

U.S. Pat. No. 6,290,606 to Hodson discloses a typical polygonal ball drive system for earth auger, comprising a ball member provided on top of an auger member, and a socket member to be attached onto the ball member of the auger member. However, the socket member may not be locked to the ball member of the auger member and may have a good chance to be disengaged from the ball member of the auger member.

The present invention has arisen to mitigate and/or obviate the afore-described disadvantages of the conventional pivotal driving tool devices.

SUMMARY OF THE INVENTION

The primary objective of the present invention is to provide a pivotal driving tool assembly including a lock device to movably or adjustably locking tool members together, and to prevent the tool members from being disengaged from each other.

In accordance with one aspect of the invention, there is provided a pivotal driving tool assembly comprising a first component including a first end having an engaging device provided thereon, and including a second end having a cavity formed therein and having a non-circular cross section defined by at least three planer side walls, the first component including an inner peripheral groove formed in the second end thereof, distal to the engaging device, the first component including at least one depression formed therein, a retaining ring engaged in the inner peripheral groove of the first component, a second component including a first end having a driving shank provided thereon and having a non-circular cross section defined by at least three curved side walls, for engaging into the non-circular cavity of the first component, the curved side walls of the second component being engageable with the planer side walls of the first component, to allow the first component to be rotated and driven by the second component. The second component includes at least one spring biased projection provided therein and engageable with the depression of the first component, to anchor the driving shank of the second component to the first component, the second component includes a narrowed neck portion provided in a middle portion thereof and close to the driving shank thereof, to allow the second component to be pivoted relative to the first component, and to allow longitudinal axes of the first and the second components to be pivoted relative to each other to different angular positions, the second component includes at least one flat surface formed in the middle portion thereof, and arranged to have the narrowed neck portion located between the curved side walls and the flat surface thereof, to selectively engage with the planer side walls of the first component, and to solidly anchor the driving shank of the second component to the first component. A magnetic member is disposed in the first component, for acting on and for selectively pulling the driving shank of the second component into the cavity of the first component, and a barrel is slidably engaged onto the first component, and movable relative to the first component, to selectively engaged onto and disengaged from the second component.

The engaging device of the first component is an engaging hole formed in the first end of the first component. The engaging device of the first component is a driving stem extended from the first end of the first component. The second component is preferably a mandrel.

The second component includes a peripheral shoulder formed in the middle portion thereof, and arranged to engage with the second end of the first component, and to solidly anchor the driving shank of the second component to the first component. The first component includes a space formed therein to receive the magnetic member.

The first component includes a positioning ring engaged thereon, the barrel includes at least one inner peripheral recess formed therein, to receive the positioning ring, and to limit the barrel to slide relative to the first component. The first component includes an outer peripheral groove formed in an outer peripheral portion thereof, for engaging with the positioning ring.

Further objectives and advantages of the present invention will become apparent from a careful reading of the detailed

BRIEF DESCRIPTION OF THE DRAWINGS

FIG. 2 is a partial cross sectional view of the pivotal driving tool assembly;

FIG. 3 is a partial cross sectional view similar to FIG. 2, illustrating the operation of the pivotal driving tool assembly;

DETAILED DESCRIPTION OF THE PREFERRED EMBODIMENT

Figure 1:
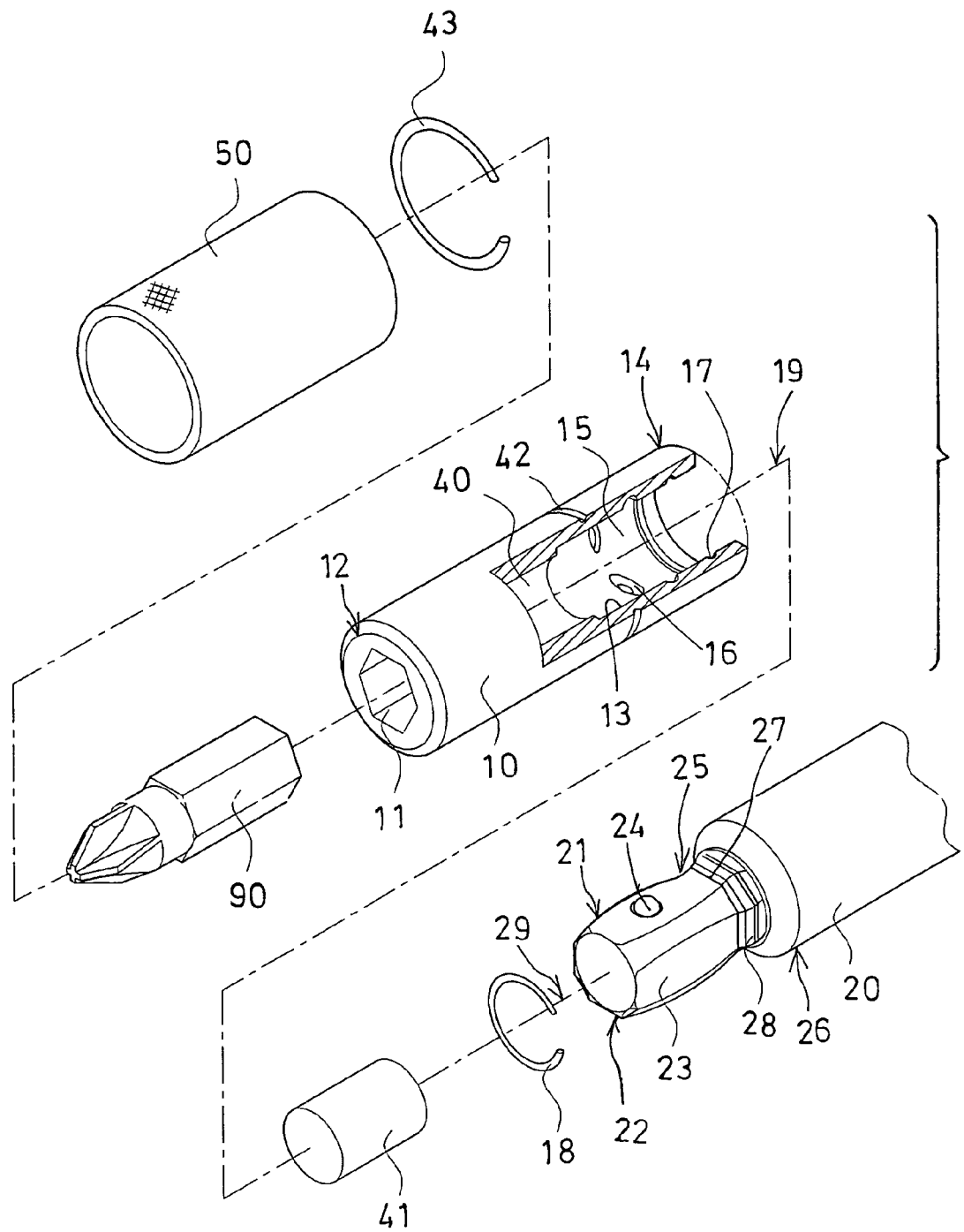
FIG. 1 is an exploded view of a pivotal driving tool assembly in accordance with the present invention.

Referring to the drawings, and initially to FIGS. 1 and 2, a pivotal driving tool assembly in accordance with the present invention comprises a first component 10, such as a follower or a socket 10 including an engaging means or device 11 formed or provided in one end 12 thereof, for engaging with and for driving fasteners, tool extensions, tool bits, or other tool elements (not shown).

For example, the engaging device 11 of the first component 10 may be an engaging hole 11 (FIGS. 1–6) formed in the end 12 of the first component 10 for receiving or engaging with the fasteners, the tool extensions, the tool bits 90, or other tool elements; or may be a driving stem (not shown) extended from the end 12 of the first component 10 for engaging with the fasteners, the tool extensions, the tool bits, or other tool elements.

The first component 10 includes a cavity 13 formed in the other end 14 thereof and having a non-circular cross section formed or defined by three or more parallel planer side walls 15, such as four side walls 15 (FIG. 1) or six side walls 15 (FIG. 6), each of the side walls 15 includes a depression 16 formed therein. The first component 10 further includes an inner peripheral groove 17 formed in the other end 14 thereof, distal to the engaging device 11 of the first component 10, for engaging with or for anchoring a retaining ring 18 therein.

A second component 20, such as a shaft or a mandrel 20 includes a driving shank 21 formed or provided in one end 22 thereof, and having a non-circular cross section formed or defined by three or more curved (FIGS. 2, 3) and planar side walls 23, such as four side walls 23 (FIG. 1), or six side walls 23 (FIG. 6), for engaging into the non-circular cavity 13 of the first component 10, and for engaging with the planer side walls 15 of the first component 10, in a manner as to accommodate swiveling motion between the first and the second components 10, 20, or for allowing the first component 10 to be rotated or driven by the second component 20.

The second component 20 further includes one or more spring biased projections 24 engaged or provided in the corresponding planer side walls 23 of the driving shank 21 of the second component 20, for engaging into the corresponding depressions 16 of the first component 10, and for positioning or anchoring the driving shank 21 of the second component 20 to the first component 10.

Figure 5:
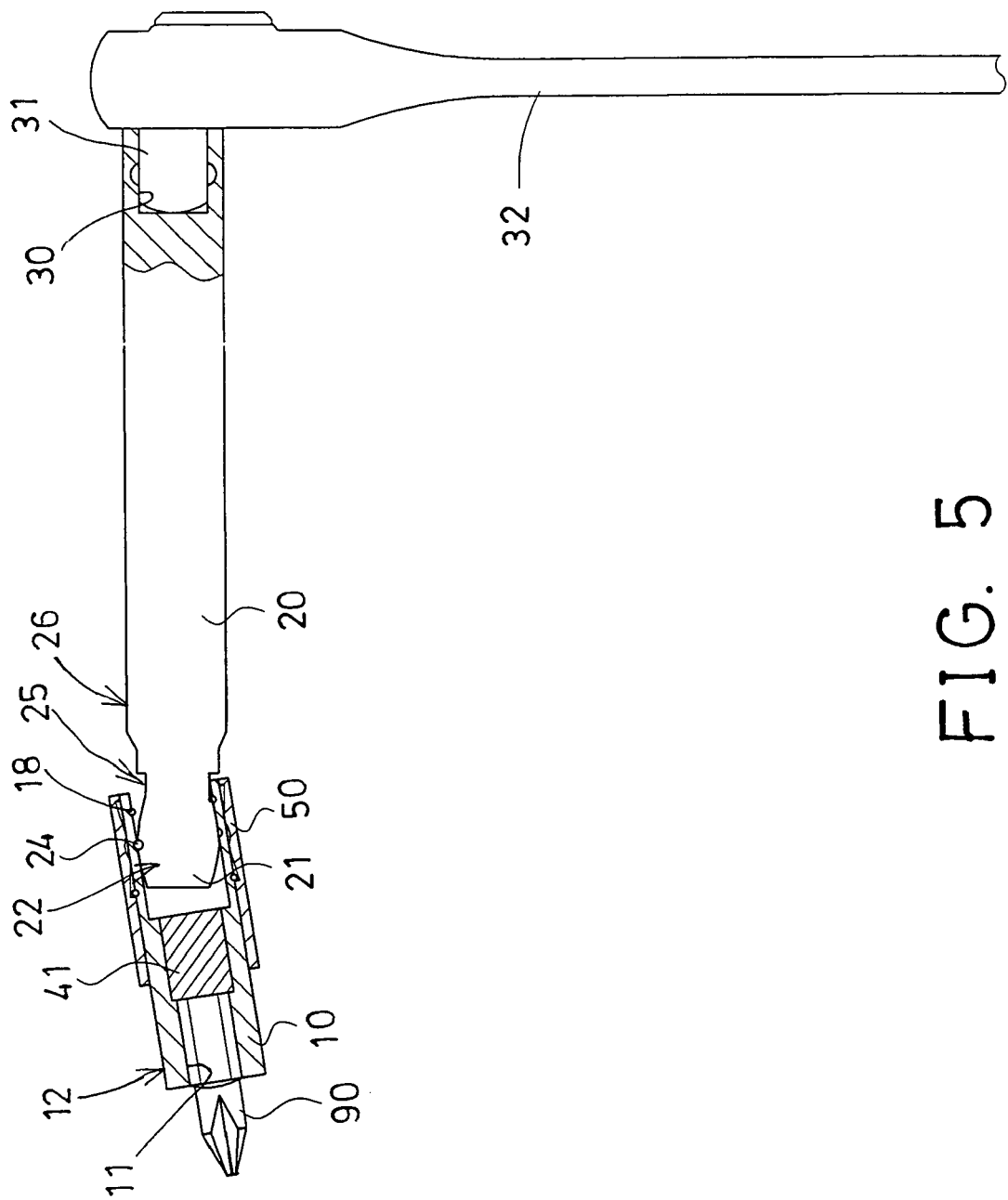
Figure 6:
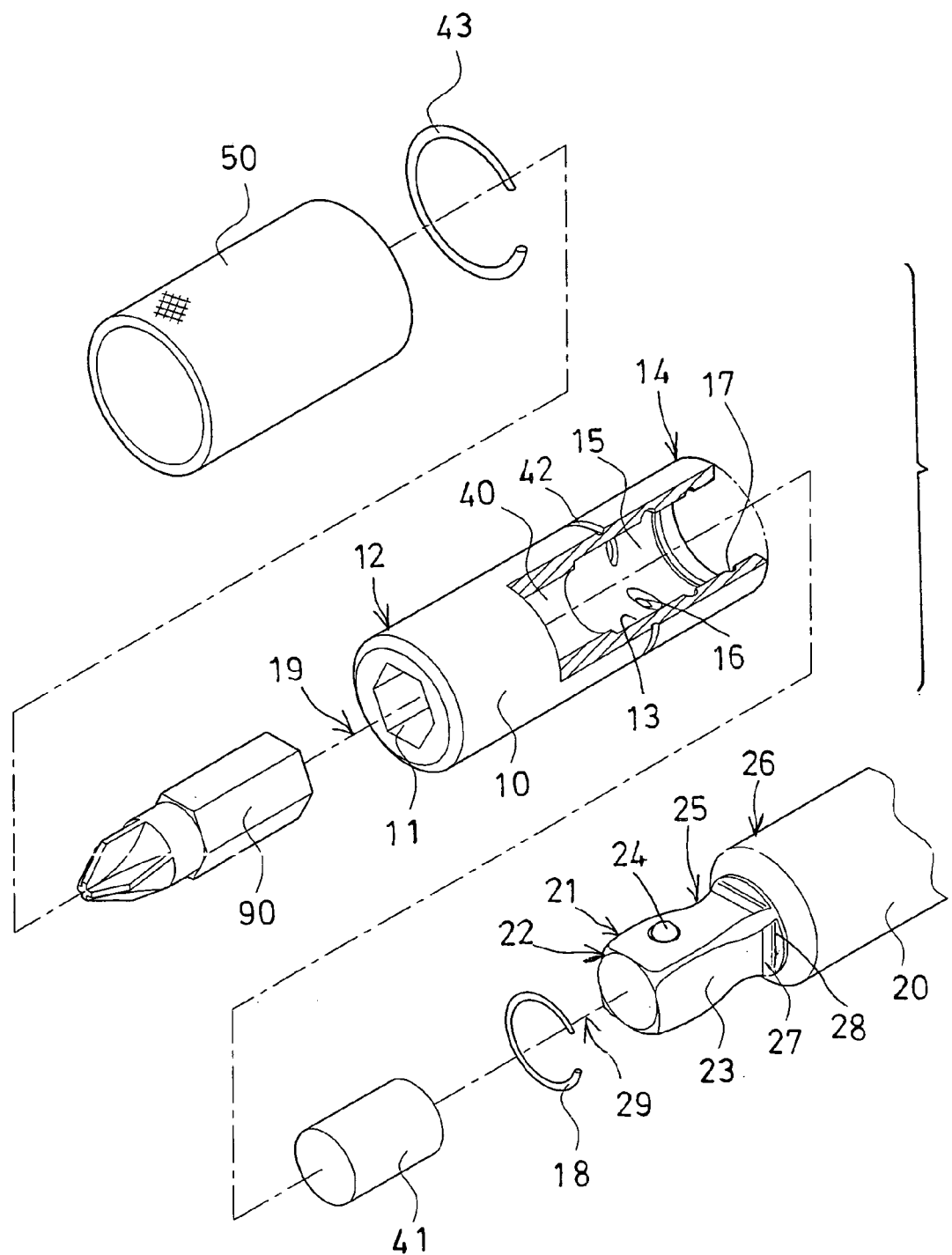
FIG. 6 is an exploded view similar to FIG. 1, illustrating the other arrangement of the pivotal driving tool assembly.

The second component 20 further includes a narrowed neck portion 25 formed or provided therein, such as located in the middle portion 26 thereof and close to the driving shank 21 thereof, for allowing the second component 20 to be rotated or pivoted relative to the first component 10 (FIGS. 3, 5), or for allowing the longitudinal axes 19, 29 of the first and the second components 10, 20 to be rotated or pivoted relative to each other to different angular positions (FIGS. 3, 5).

It is preferable that the second component 20 further includes three or more flat surfaces 27 formed or provided in the middle portion 26 thereof, and arranged to have the narrowed neck portion 25 formed or located between the corresponding curved planer side walls 23 and the flat surfaces 27 thereof, for selectively engaging with the planer side walls 15 of the first component 10 (FIGS. 2, 4), and for further solidly anchoring the driving shank 21 of the second component 20 to the first component 10.

The second component 20 further includes a peripheral shoulder 28 formed or provided in the middle portion 26 thereof, and arranged to engage with the other end 14 of the first component 10, and for further solidly anchoring the driving shank 21 of the second component 20 to the first component 10, and for allowing the second component 20 to be solidly rotated or driven by the first component 10.

The second component 20 includes a cavity 30 formed in the other end thereof, for receiving a driving shank 31 of a driving tool 32, 33, such as a ratchet wrench 32 (FIG. 5), a power tool 33 (FIG. 4), or other driving tools, for allowing the first component 10 to be rotated or driven by the driving tool 32, 33 via the second component 20.

Figure 4:
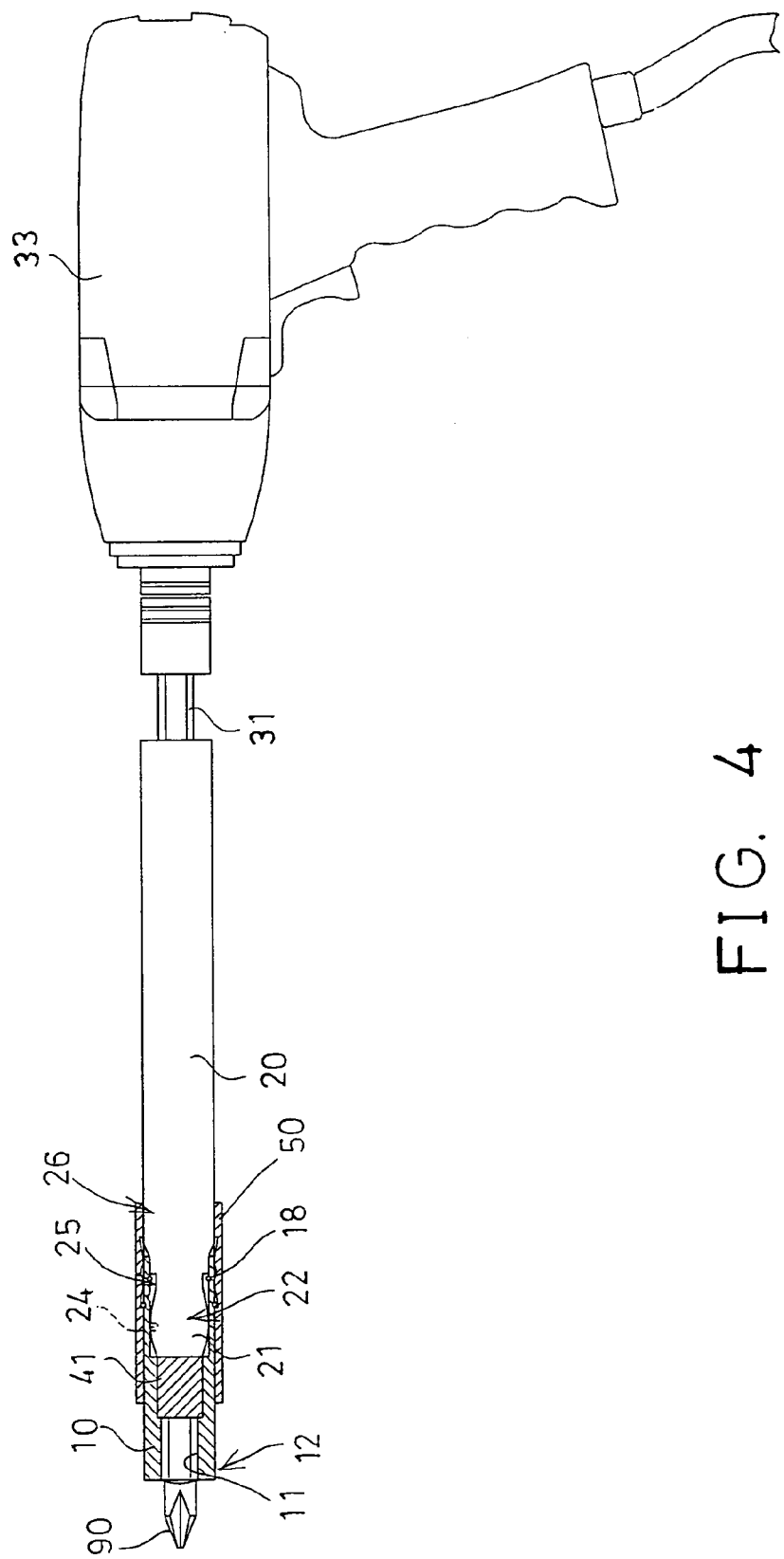
FIGS. 4, 5 are partial cross sectional views similar to FIGS. 2, 3, illustrating the operation of the pivotal driving tool assembly by driving tools.

In operation, as shown in FIGS. 2, 4, the driving shank 21 of the second component 20 may be engaged into the non-circular cavity 13 of the first component 10, and may have the curved planer side walls 23 engaged with the planer side walls 15 of the first component 10, and may have the flat surfaces 27 thereof selectively engaged with the planer side walls 15 of the first component 10, to allow the second component 20 to be solidly rotated or driven by the first component 10.

The spring biased projections 24 of the second component 20 may further be engaged with the depressions 16 of the first component 10, and the peripheral shoulder 28 of the second component 20 may further be selectively engaged with the other end 14 of the first component 10, to further solidly anchor the driving shank 21 of the second component 20 to the first component 10.

When the second component 20 is slightly pulled or moved outwardly of the non-circular cavity 13 of the first component 10, as shown in FIGS. 3, 5, the second component 20 may be rotated or pivoted relative to the first component 10, to allow the longitudinal axes 19, 29 of the first and the second components 10, 20 to be rotated or pivoted relative to each other to different angular positions, and for allowing the first component 10 to be rotated or by the second component 20 even when the first and the second components 10, 20 are tilted relative to each other at different angular positions.

The retaining ring 18 may be engaged with the driving shank 21 of the second component 20, to position the driving shank 21 of the second component 20 in the cavity 13 of the first component 10, and to prevent the driving shank 21 of the second component 20 from being pulled or moved and disengaged from the first component 10 inadvertently.

The curved and planar side walls 23 of the second component 20 are arranged to allow the driving shank 21 of the second component 20 to be engaged into or disengaged from the cavity 13 of the first component 10 by forcing the retaining ring 18 into the peripheral groove 17 of the first component 10, and thus to allow different or the other second components 20 to be changeably attached or coupled to the first component 10.

As shown in the drawings, the first component 10 includes a space 40 formed in the inner and intermediate portion thereof, for receiving or securing a magnetic member 41 therein, which may act on the driving shank 21 of the second component 20, to pull the driving shank 21 of the second component 20 into the cavity 13 of the first component 10 (FIGS. 2, 4), and to allow the driving shank 21 to be attracted into the cavity 13 of the first component 10 automatically when the users slightly shake or vibrate the second component 20.

It is further preferable that the first component 10 includes an outer peripheral groove 42 formed in the outer peripheral portion thereof, for engaging with or for anchoring another retaining ring or positioning ring 43 thereon. A barrel 50 may further be provided and slidably engaged onto the outer peripheral portion of the first component 10, and includes two inner peripheral recesses 51 formed therein (FIGS. 2, 3), to receive the positioning ring 43, and to limit the sliding movement of the barrel 50 relative to the first component 10.

For example, as shown in FIGS. 3 and 5, when the barrel 50 is slid and moved onto the first component 10 and disengaged from the second component 20, and when the second component 20 is slightly pulled or moved outwardly of the non-circular cavity 13 of the first component 10, the second component 20 may be rotated or pivoted relative to the first component 10.

On the contrary, when the barrel 50 is slid and moved onto the second component 20, as shown in FIGS. 2 and 4, the second component 20 may further be solidly secured or anchored or locked to the first component 10, to prevent the second component 20 from being rotated or pivoted relative to the first component 10.

Accordingly, the pivotal driving tool assembly in accordance with the present invention includes a lock device to movably or adjustably locking tool members together, and to prevent the tool members from being disengaged from each other.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pivotal driving tool assembly comprising:
a first component including a first end having an engaging device provided thereon, and including a second end having a cavity formed therein and having a non-circular cross section defined by at least three planer side walls, said first component including an inner peripheral groove formed in said second end thereof, distal to said engaging device, said first component including at least one depression formed therein,
a retaining ring engaged in said inner peripheral groove of said first component,
a second component including a first end having a driving shank provided thereon and having a non-circular cross section defined by at least three curved side walls, for engaging into said non-circular cavity of said first component, said at least three curved side walls of said second component being engageable with said at least three planer side walls of said first component, to allow said first component to be rotated and driven by said second component,
said second component including at least one spring biased projection provided therein and engageable with said at least one depression of said first component, to anchor said driving shank of said second component to said first component,
said second component including a narrowed neck portion provided in a middle portion thereof and close to said driving shank thereof, to allow said second component to be pivoted relative to said first component, and to allow longitudinal axes of said first and said second components to be pivoted relative to each other to different angular positions,
said second component including at least one flat surface formed in said middle portion thereof, and arranged to have said narrowed neck portion located between said at least three curved side walls and said at least one flat surface thereof, to selectively engage with said at least three planer side walls of said first component, and to solidly anchor said driving shank of said second component to said first component,
a magnetic member disposed in said first component, for acting on and for selectively pulling said driving shank of said second component into said cavity of said first component, and
a barrel slidably engaged onto said first component, and movable relative to said first component, to selectively engaged onto and disengaged from said second component.

2. The pivotal driving tool assembly as claimed in claim 1, wherein said engaging device of said first component is an engaging hole formed in said first end of said first component.

3. The pivotal driving tool assembly as claimed in claim 1, wherein said engaging device of said first component is a driving stem extended from said first end of said first component.

4. The pivotal driving tool assembly as claimed in claim 1, wherein said second component is a mandrel.

5. The pivotal driving tool assembly as claimed in claim 1, wherein said second component includes a peripheral shoulder formed in said middle portion thereof, and arranged to engage with said second end of said first component, and to solidly anchor said driving shank of said second component to said first component.

6. The pivotal driving tool assembly as claimed in claim 1, wherein said first component includes a space formed therein to receive said magnetic member.

7. The pivotal driving tool assembly as claimed in claim 1, wherein said first component includes a positioning ring engaged thereon, said barrel includes at least one inner peripheral recess formed therein, to receive said positioning ring, and to limit said barrel to slide relative to said first component.

8. The pivotal driving tool assembly as claimed in claim 7, wherein said first component includes an outer peripheral groove formed in an outer peripheral portion thereof, for engaging with said positioning ring.

* * * * *